United States Patent
Vandersteegen (10) Patent No.: US 10,571,302 B2
(45) Date of Patent: Feb. 25, 2020

(54) ROTARY POSITION SENSOR

(71) Applicant: Melexis Technologies SA, Bevaix (CH)

(72) Inventor: Peter Vandersteegen, Deurne (BE)

(73) Assignee: Melexis Technologies SA, Bevaix (CH)

( * ) Notice: Subject to any disclaimer, the term of this patent is extended or adjusted under 35 U.S.C. 154(b) by 0 days.

(21) Appl. No.: 15/943,983

(22) Filed: Apr. 3, 2018

(65) Prior Publication Data

US 2018/0292233 A1 Oct. 11, 2018

(30) Foreign Application Priority Data

Apr. 6, 2017 (EP) ...................................... 17165271

(51) Int. Cl.
*G01D 5/244* (2006.01)
*G01D 5/14* (2006.01)
*B62D 15/02* (2006.01)
*G01D 5/04* (2006.01)
*G01B 7/00* (2006.01)
(Continued)

(52) U.S. Cl.
CPC ......... *G01D 5/145* (2013.01); *B62D 15/0215* (2013.01); *G01B 7/003* (2013.01); *G01B 7/30* (2013.01); *G01D 5/04* (2013.01); *G01D 5/24438* (2013.01); *G01D 5/24461* (2013.01); *G01P 3/487* (2013.01)

(58) Field of Classification Search
CPC ............................ G01D 5/145; G01D 5/24438
See application file for complete search history.

(56) References Cited

U.S. PATENT DOCUMENTS 6,969,988 B2 11/2005 Kakuta et al.
7,637,020 B2 12/2009 Maier et al.
(Continued)

FOREIGN PATENT DOCUMENTS

EP 1437575 A1 7/2004
EP 1830155 A1 9/2007
(Continued)

OTHER PUBLICATIONS

European Search Report from EP Application No. 17165271.2, dated Jul. 7, 2017.
(Continued)

*Primary Examiner* — Son T Le
*Assistant Examiner* — Adam S Clarke
(74) *Attorney, Agent, or Firm* — Workman Nydegger (57) ABSTRACT

A rotary position sensor comprises a magnetic sensor for generating two independent signals indicative of at least two different order magnetic fields, and a magnetic assembly forming a first magnetic field component having a first order at the location of the magnetic sensor, in which the first magnetic field component is rotatable relative to the magnetic sensor by receiving a first angle. The magnetic assembly is also adapted for forming a second magnetic field component having a second order, different from the first order, at the location of the magnetic sensor, in which the second magnetic field component is rotatable relative to the magnetic sensor and the first magnetic assembly by receiving a second angle. The position sensor comprises a processor for combining the two independent signals to produce a unique system state representative of the first and second angle.

15 Claims, 7 Drawing Sheets

(51) Int. Cl.
   *G01B 7/30* (2006.01)
   *G01P 3/487* (2006.01)

(56) References Cited

U.S. PATENT DOCUMENTS

| | | |
|---|---|---|
| 8,154,427 B2 | 4/2012 | Mayer et al. |
| 2005/0127899 A1 | 6/2005 | Kakuta et al. |
| 2009/0021246 A1* | 1/2009 | Uehira ............... B62D 15/0215 324/207.25 |
| 2010/0060272 A1 | 3/2010 | Tanaka et al. |
| 2010/0301845 A1 | 12/2010 | Acker |
| 2013/0328550 A1* | 12/2013 | Sebastiano ............. G01B 7/023 324/207.12 |
| 2014/0028294 A1* | 1/2014 | Granig ................... G01D 5/145 324/207.12 |
| 2015/0226581 A1 | 8/2015 | Schott et al. |

FOREIGN PATENT DOCUMENTS

| | | |
|---|---|---|
| WO | 03081182 A1 | 10/2003 |
| WO | 2014029885 A1 | 2/2014 |

OTHER PUBLICATIONS

European Search Report from EP Application No. 18163508.7, dated Aug. 21, 2018.

* cited by examiner

ROTARY POSITION SENSOR

FIELD OF THE INVENTION

The invention relates to the field of rotary position sensors, e.g. for determining a state representative of at least one angle, e.g. of a rotation angle of a shaft that can exceed 360° with respect to a reference angle, such as for use in a steering column. More specifically, it relates to a rotary position sensor and a related method.

BACKGROUND OF THE INVENTION

Various application require a sensor to detect an angular position of a shaft, in which an angle in excess of 360° needs to be detected. For example, an angular position may be detected in combination with a number of revolutions of an input shaft.

It is known in the art to use a counter for counting the revolutions of a code carrier which is driven by the shaft. In another approach, it is known to provide a multiturn angular position sensor by actuating a plurality of gear stages with the input shaft. Thus, different gear transmission ratios can be used for measuring the multiturn angle by observing multiple angles, associated with the different gear transmission ratios, in which each observed angle has a different relation to the multiturn angle of the input shaft to be determined.

For example, it is known in the art to provide a multiturn rotary encoder for determining an angle of rotation of a shaft with respect to a predetermined reference that can exceed 360°. For example, U.S. Pat. No. 8,154,427 discloses such multiturn rotary encoder comprising a single-turn unit that includes a code carrier and a single-turn evaluation unit for processing single-turn position signals to form a single-turn code word, and a first multiturn unit, including at least one first multiturn code carrier and a first multiturn evaluation unit for processing first multiturn position signals to form a first multiturn code word that indicates the number of revolutions covered by the input shaft. The device also comprises a second multiturn unit, including at least one second multiturn code carrier and a second multiturn evaluation unit for processing second multiturn position signals to form a second multiturn code word that likewise indicates the number of revolutions covered by the input shaft. The multiturn code words may thus be generated independently of each other, and the functioning of the multiturn units may be ascertained by the two multiturn code words.

It is also known in the art to determine an axis using a magnetic sensor. In such prior art devices, a magnet may be mechanically linked to a gear wheel, and a magnetic sensor is used to determine the angular position of the magnet. For example, different magnetic sensors may detect the magnetic field, e.g. a magnetic field orientation, of corresponding magnets linked to corresponding gear wheels, in which each gear wheel has a different gear transmission ratio with respect to a hub gear wheel mechanically connected to an input shaft. These magnetic sensors use the nonius principle to come to an accurate angle determination. Thus, a multiturn angle of the input shaft can be detected if appropriate different gear transmission ratios are used.

For example, U.S. Pat. No. 7,637,020 discloses a rotation angle sensor for determining an absolute angular position of a body that can rotate through several rotations. The sensor includes two code wheels which rotate as the body rotates. The code wheels are driven at a different gear ratio such that the code wheels rotate faster than the body and the code wheels rotate at different rates. Two sensor elements respectively determine the rotational angle positions of the code wheels. The difference between the rotational angle positions is a beat angle. The different gear ratio is selected such that beat angle periods are in an angular measuring range of the sensor and the absolute angular positions of the code wheels in the beat angle periods is different. The absolute angular positions of the code wheels in successive beat angle periods is offset by the nth part of the measuring range of a sensor element, where n is number of beat angle periods.

US 2015/226581 discloses an arrangement for measuring an angular position of a rotor with respect to a stator. This arrangement comprises a multi-pole magnet mounted on the rotor, a sensor mounted on the stator and a plurality of sensor elements organized in two groups or four groups for measuring a magnetic field component. A method for calculating the angular position based on the signals of the elements of each group is disclosed. Thus, a magnetic sensor can be provided that measures a magnetic field of a multipole magnet, while being substantially insensitive to a dipole field.

SUMMARY OF THE INVENTION

It is an object of embodiments of the present invention to provide good and efficient means of determining an angle, e.g. determining an angle in a range that exceeds at least one full revolution, e.g. at least two revolutions, or a combination of angles.

The above objective is accomplished by a method and device in accordance with the present invention.

It is an advantage of embodiments of the present invention that multiple angles can be efficiently determined using a single magnetic sensor, e.g. a single integrated circuit magnetic sensor.

It is an advantage of embodiments of the present invention that a multiturn angle can be determined using a single magnetic sensor, e.g. a single integrated circuit magnetic sensor.

It is an advantage of embodiments of the present invention that two rotations of different magnetic assemblies, coupled at a different ratio to an input shaft, can enable an accurate determination of an angular position in a range exceeding 360 degrees, e.g. over multiple rotations of the input shaft, by a single magnetic sensor element.

In a first aspect, the present invention relates to a rotary position sensor, e.g. a multiturn rotary position sensor for sensing a rotary position of a shaft. The rotary position sensor comprises a magnetic sensor for detecting two different orders of a multipole expansion of a magnetic field, e.g. two different order magnetic fields, and generating two independent signals indicative of said two different orders of said multipole expansion, e.g. said two different order magnetic fields. The rotary position sensor also comprises a magnetic assembly for forming a first magnetic field component having a first multipole order, which corresponds to one of the two different orders of said multipole expansion that are detectable by the magnetic sensor, at the location of the magnetic sensor, in which this first magnetic field component is rotatable relative to the magnetic sensor over a first angle, e.g. by receiving the first angle. The magnetic assembly is also adapted for forming a second magnetic field component having a second multipole order, different from the first multipole order and corresponding to another of the two different order magnetic fields detectable by the magnetic sensor, at the location of the magnetic sensor, in which the second magnetic field component is rotatable relative to the magnetic sensor and relative to the first magnetic field component over a second angle, e.g. by receiving the second angle. The rotary position sensor also comprises a processor for receiving the two independent signals and for combining them to produce a unique system state representative of the first angle and the second angle.

In a rotary position sensor in accordance with embodiments of the present invention, the magnetic assembly may be adapted for receiving the first angle and the second angle from a common shaft in accordance with different predetermined transmission ratios for the first angle and the second angle.

For example, the magnetic assembly may be mechanically coupled to an input shaft, e.g. to the common shaft such as to receive the first angle and the second angle, such that the first angle relates to an input angle of the input shaft via a first transmission ratio and the second angle relates to the input angle via a second transmission ratio different from the first transmission ratio.

In a rotary position sensor in accordance with embodiments of the present invention, the processor may be adapted for combining the two independent signals to produce the unique system state in the form of a unique angular position representative of an angle and a number of revolutions of the common shaft by taking the predetermined transmission ratios into account.

In a rotary position sensor in accordance with embodiments of the present invention, the magnetic sensor may be adapted for detecting at least two different order magnetic fields, e.g. the orders of said multipole expansion, comprising at least two of the following: a dipole magnetic field, a quadrupole magnetic field, a sextupole magnetic field, an octupole magnetic field and a decapole magnetic field, in which the two independent signals may be adapted for distinguishing these at least two different order magnetic fields.

For example, the first magnetic field component may be a dipole magnetic field and the second magnetic field component may be a quadruple, sextupole, octupole or decapole magnetic field.

For example, the first magnetic field component may be a quadrupole field and the second magnetic field may be a sextupole or decapole magnetic field.

In a rotary position sensor in accordance with embodiments of the present invention, the magnetic sensor may be adapted for detecting at least a dipole magnetic field and a quadrupole magnetic field, and for generating the two independent signals as independent signals indicative of the dipole magnetic field and the quadrupole magnetic field.

In a rotary position sensor in accordance with embodiments of the present invention, the magnetic assembly may comprise a first magnetic assembly for forming the first magnetic field component having the first multipole order at the location of the magnetic sensor, the first magnetic assembly being rotatable relative to the magnetic sensor by receiving the first angle, and wherein the magnetic assembly may comprise a second magnetic assembly for forming the second magnetic field component having the second multipole order at the location of the magnetic sensor, the second magnetic assembly being rotatable relative to the magnetic sensor and relative to the first magnetic assembly by receiving the second angle.

In a rotary position sensor in accordance with embodiments of the present invention, the first magnetic assembly may comprise a quadrupole magnet for forming the first magnetic field component having the first order in the form of a quadrupole magnetic field.

In a rotary position sensor in accordance with embodiments of the present invention, the second magnetic assembly may comprise a dipole magnet for producing the second magnetic field component having the second order in the form of a dipole magnetic field at the location of the magnetic sensor.

In a rotary position sensor in accordance with embodiments of the present invention, the second magnetic assembly may be adapted for altering, e.g. locally reshaping, the first magnetic field component generated by the first magnetic assembly by its presence, such as to produce the second magnetic field component having the second multipole order.

In a rotary position sensor in accordance with embodiments of the present invention, the second magnetic assembly may comprise a magnetic flux concentrator for locally changing the magnetic field configuration of the magnetic field generated by the first magnetic assembly, such that the second magnetic field component of the second order is observed by the magnetic sensor.

In a rotary position sensor in accordance with embodiments of the present invention, the magnetic flux concentrator may comprise at least one segment having a first part located in a region near the first magnetic assembly and a second part in a region near the magnetic sensor, e.g. a first part being proximal to the first magnetic assembly and distal to the magnetic sensor and a second part being distal to the first magnetic assembly and proximal to the magnetic sensor. The first part and the second part may be offset over a predetermined angle around the axis of rotation of the first magnetic assembly, such that magnetic field lines of the magnetic field component generated by the first magnetic assembly are locally displaced over this predetermined angle at the level of the magnetic sensor.

In a rotary position sensor in accordance with embodiments of the present invention, the magnetic flux concentrator may comprise two of said segments, such that the second parts are arranged opposite to each other and the first parts are arranged next to each other.

A rotary position sensor in accordance with embodiments of the present invention may comprise a gear transmission assembly for converting an input angle from an input shaft, e.g. the common input shaft, to respectively the first angle applied to rotate the first magnetic field component, e.g. applied to rotate the first magnetic assembly, and to the second angle applied to rotate the second magnetic field component, e.g. applied to rotate the second magnetic assembly.

In a rotary position sensor in accordance with embodiments of the present invention, the gear transmission assembly may comprise a first gear wheel for rotating the first magnetic assembly and a second gear wheel for rotating the second magnetic assembly. The first gear wheel and the second gear wheel may have a different number of teeth, and/or a different perimeter, for generating the different first and second angles, and the first gear wheel and the second gear wheel may receive an input angle from a common gear wheel mechanically linked to the input shaft for which a multiturn angle is to be determined.

In a rotary position sensor in accordance with embodiments of the present invention, the processor and the magnetic sensor may be cointegrated in a semiconductor integrated circuit device.

In a rotary position sensor in accordance with embodiments of the present invention, the processor may be adapted for calculating a first angle, e.g. a first value, based on a first signal (of the two independent signals) that is indicative of the first magnetic field component having the first multipole order. The processor may be adapted for calculating a second angle, e.g. a second value, based on a second signal (of the two independent signals) that is indicative of the second magnetic field component having the second multipole order. The processor may be adapted for calculating, based on at least the second angle, e.g. on at least the second value, a segment of the angular position of the shaft, e.g. of the common input shaft, in which this segment corresponds to an integer value of the number of segments the shaft is rotated with respect to a reference angular position and in which each segment is representative of a single period of the angular symmetry of the first magnetic field component.

In a second aspect, the present invention relates to a method for determining a rotary position, e.g. a multiturn rotary position of a shaft. The method may comprise converting an angle provided by a rotation of a shaft into a first angle and a second angle in accordance with different predetermined transmission ratios. The method comprises applying a first angle to rotate a first magnetic field component having a first multipole order at the location of the magnetic sensor. For example, the method may comprise applying the first angle to rotate a first magnetic assembly relative to a magnetic sensor, in which the first magnetic assembly forms the magnetic field component having a first multipole order at the location of the magnetic sensor. The method comprises applying a second angle to rotate a second magnetic field component having the second multipole order, different from the first multipole order, at the location of the magnetic sensor. For example, the method may comprise applying the second angle to rotate a second magnetic assembly relative to the magnetic sensor and relative to the first magnetic assembly, in which the second magnetic assembly forms the second magnetic field component having the second multipole order, different from the first multipole order, at the location of the magnetic sensor. The method comprises a step of, using the magnetic sensor, detecting the first order magnetic field component and the second order magnetic field component, and generating two independent signals indicative of respectively the first order magnetic field component and the second order magnetic field component. The method also comprises combining the at least two independent signals to produce a unique system state representative of the first angle and the second angle, e.g. to produce a unique angular position representative of an angle and a number of revolutions of the shaft by taking the predetermined transmission ratios into account.

In a method in accordance with embodiments of the present invention, the first order magnetic field component may be a quadrupole magnetic field, and the second order magnetic field component may be a dipole magnetic field.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a rotary position sensor. The rotary position sensor comprises a magnetic sensor for detecting at least two different order magnetic fields and generating at least two independent signals indicative of the at least two different order magnetic fields. The sensor further comprises a magnetic assembly forming a first magnetic field component having a first multipole order at the location of the magnetic sensor. The magnetic assembly is adapted for rotating the first magnetic field component relative to the magnetic sensor by receiving a first angle. The magnetic assembly is adapted for producing a second magnetic field component having a second multipole order, different from the first multipole order, at the location of the magnetic sensor. The magnetic assembly is adapted for rotating the second magnetic field component relative to the magnetic sensor and relative to the first magnetic field component by receiving a second angle. The sensor also comprises a processor for receiving the two independent signals and for combining them to produce a unique system state representative of the first angle and the second angle.

Figure 1:
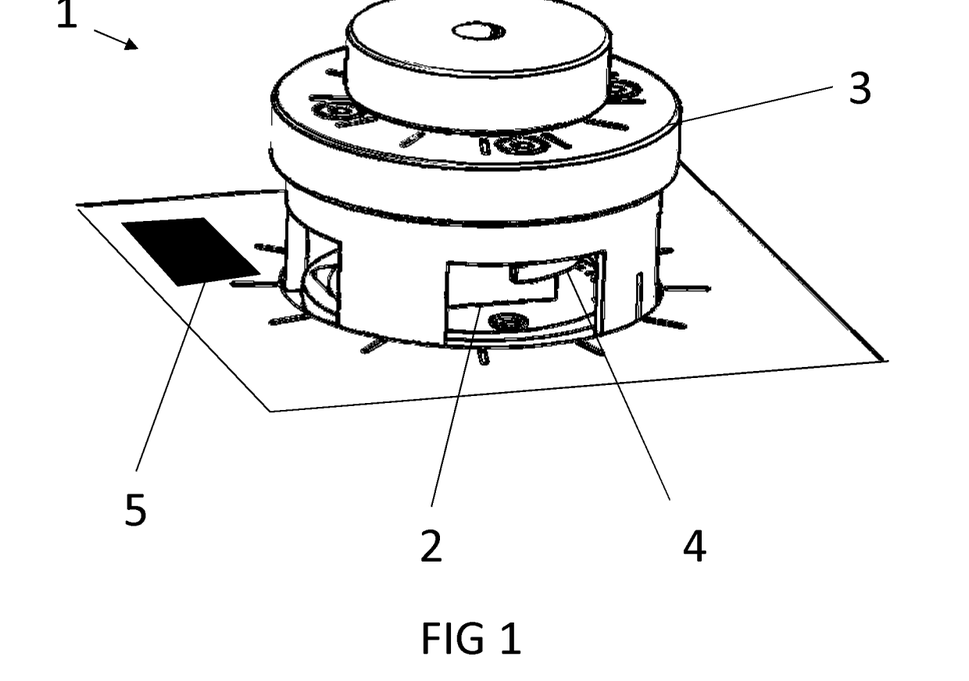
FIG. 1 shows an exemplary embodiment of a multiturn rotary position sensor in accordance with embodiments of the present invention.

Referring to FIG. 1, an exemplary embodiment of a rotary position sensor 1, e.g. a multiturn rotary position sensor, in accordance with embodiments of the present invention is shown.

The sensor may be adapted for sensing a rotary position of a shaft, over an angular range that exceeds 360°, e.g. an angular position representative of an angle and a number of revolutions of the shaft.

The rotary position sensor comprises a magnetic sensor 2 for detecting at least two different order magnetic fields and generating at least two independent signals indicative of the at least two different order magnetic fields. For example, the magnetic sensor may be adapted for detecting at least a dipole magnetic field and a quadrupole magnetic field, and generating independent signals indicative of the dipole magnetic field and the quadrupole magnetic field.

The at least two different order of the magnetic fields refer to different orders in the sense of a multipole expansion of the magnetic field, e.g. a mathematical multipole decomposition, for example a Laplace expansion in solid spherical harmonic functions. In other words, the different order does not refer to, for example, a different order of magnitude, but may refer to a different order of multipole expansion terms. Furthermore, the first order and the second order do not necessarily refer to the first order expansion term and the second order expansion term of such multipole expansion, but rather to two different order expansion terms that are identified by 'the first' and 'the second' for the sake of clarity in referring to a specific one of these two different multipole orders.

The rotary position sensor also comprises a magnetic assembly 3,4 for forming a magnetic field component having a first multipole order at the location of the magnetic sensor. The first magnetic field component is rotatable relative to the magnetic sensor by receiving a first angle. The magnetic assembly is also adapted for forming a second magnetic field component having a second multipole order, different from the first multipole order, at the location of the magnetic sensor. The second magnetic field component is rotatable relative to the magnetic sensor and relative to the first magnetic field component by receiving a second angle.

The magnetic assembly may comprise a first magnetic assembly 3, e.g. a first magnetic assembly part, forming the first magnetic field component having the first multipole order at the location of the magnetic sensor. The first magnetic assembly may be adapted for being rotated relative to the magnetic sensor by receiving the first angle. For example, the first magnetic assembly may be connected to a rotor for rotating in a plane parallel to a detection surface of the magnetic sensor 2.

Figure 2:
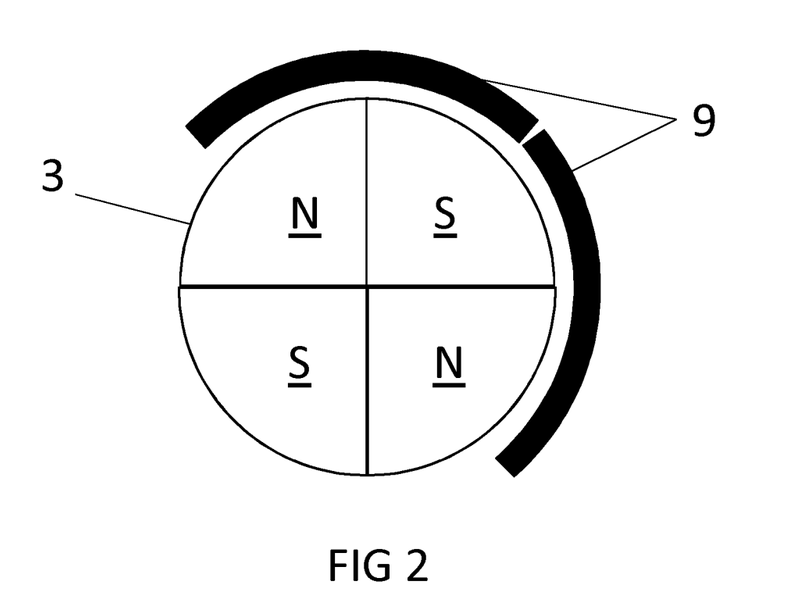
FIG. 2 shows a quadrupole magnet for use in a rotary position sensor in accordance with embodiments of the present invention.

The first magnetic assembly 3 may comprise a multipole magnet, such as a quadrupole magnet for forming a quadrupole magnetic field, e.g. the first magnetic field component having the first multipole order may be a quadrupole magnetic field. For example, the first magnetic assembly may comprise four magnet bars arranged in a cross, where the orientation of poles of adjacent magnet bars alternate. For example, a quadrupole magnet is illustrated in FIG. 2.

The magnetic assembly may comprise a second magnetic assembly 4, e.g. a second magnetic assembly part, for producing the second magnetic field component having the second multipole order, different from the first multipole order, at the location of the magnetic sensor.

For example, the second magnetic assembly 4 may comprise a dipole magnet for generating a dipole magnetic field at the location of the magnetic sensor, while the first magnetic assembly 3 may comprise a quadrupole magnet for generating a quadrupole magnetic field at the location of the magnetic sensor.

For example, the first magnetic field component having the first multipole order, e.g. a quadrupole magnetic field, may have a higher order than the second magnetic field component having the second order, e.g. a dipole magnetic field.

Figure 9:
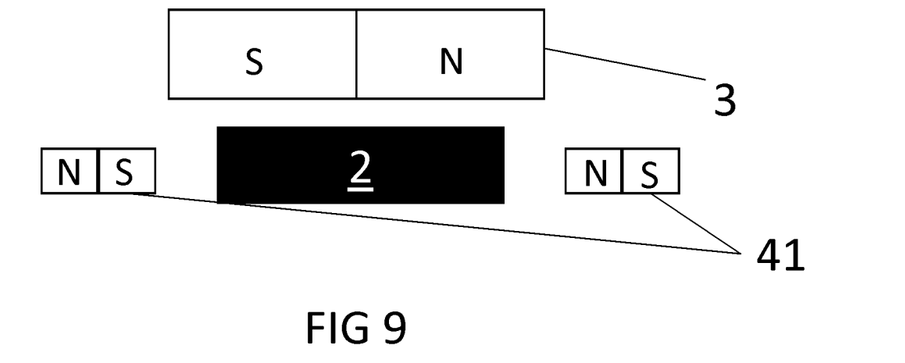
FIG. 9 shows a side view of another multiturn rotary position sensor in accordance with embodiments of the present invention in which two magnetic fields are generated by respectively one quadrupole magnet and a pair of dipole magnets.
Figure 10:
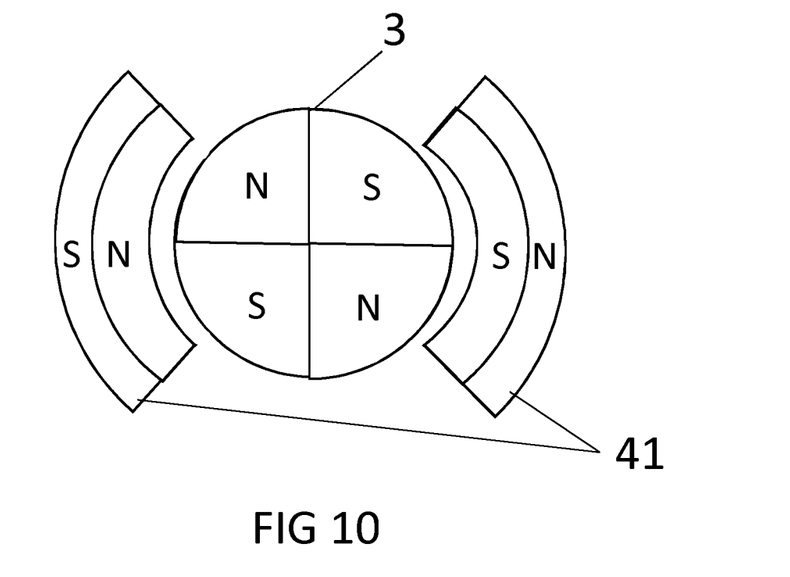
FIG. 10 shows a top view of the multiturn rotary position sensor in accordance with embodiments of the present invention shown in FIG. 9.

The first magnetic assembly 3 and/or the second magnetic assembly 4 do not necessary have a permanent magnetic field, e.g. the 'magnetic assembly' may be a device adapted for altering, e.g. substantially altering, a magnetic field, e.g. the second magnetic assembly may be adapted for altering a magnetic field generated by the first magnetic assembly 3, e.g. which may comprise a permanent magnet. However, the magnetic assembly may also generate a permanent magnetic field, e.g. by means of a permanent magnet or an electromagnet. Thus, the first and/or second magnetic assembly may comprise a permanent magnet or an electromagnet. For example, the second magnetic assembly may comprise a dipole magnet, e.g. two dipole magnets 41 that are symmetrically opposed around a common center of rotation, such as illustrated in FIG. 9 and FIG. 10.

In accordance with embodiments of the present invention, the second magnetic assembly 4 may comprise a magnetic flux concentrator. The magnetic flux concentrator may locally change the magnetic field configuration of the magnetic field generated by the first magnetic assembly 3, such that a magnetic field component of a different order, e.g. the second magnetic field component having the second order, is observed by the magnetic sensor, e.g. a dipole magnetic field superimposed on the quadrupole magnetic field generated by the first magnetic assembly 3.

Figure 3:
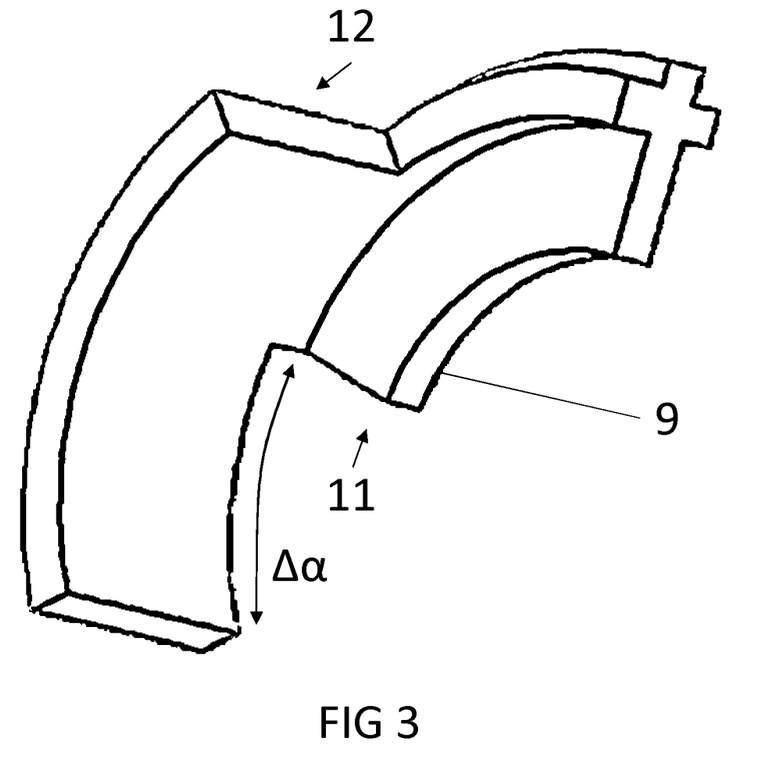
FIG. 3 shows a segment of a magnetic flux concentrator for use in a rotary position sensor in accordance with embodiments of the present invention.

Referring to FIG. 3, the magnetic flux concentrator may comprise at least one segment 9 having a first part 11, e.g. a collector part forming a collector, located in a region near the first magnetic assembly 3, e.g. a first part in a first plane perpendicular to an axis of rotation of the first magnetic assembly 3 and intersecting with the first magnetic assembly 3, and a second part 12, e.g. an excitator part forming an excitator, in a region near the magnetic sensor, e.g. a second part in a second plane perpendicular to an axis of rotation of the first magnetic assembly 3 and closer to the magnetic sensor than the first plane. The first part 11 and the second part 12 may be offset over a predetermined angle $\Delta\alpha$ around the axis of rotation of the first magnetic assembly 3, such that magnetic field lines of the magnetic field generated by the first magnetic assembly 3 are locally displaced over this predetermined angle at the level of the magnetic sensor. The first part and/or the second part may form a circle arc over an angle in the range of 60° to 120°, preferably in the range of 80° to 100°, e.g. about 90°. The absolute value of the predetermined angle $\Delta\alpha$ may for example be in the range of 30° to 60°, e.g. in the range of 40° to 50°, e.g. about 45°.

Figure 4:
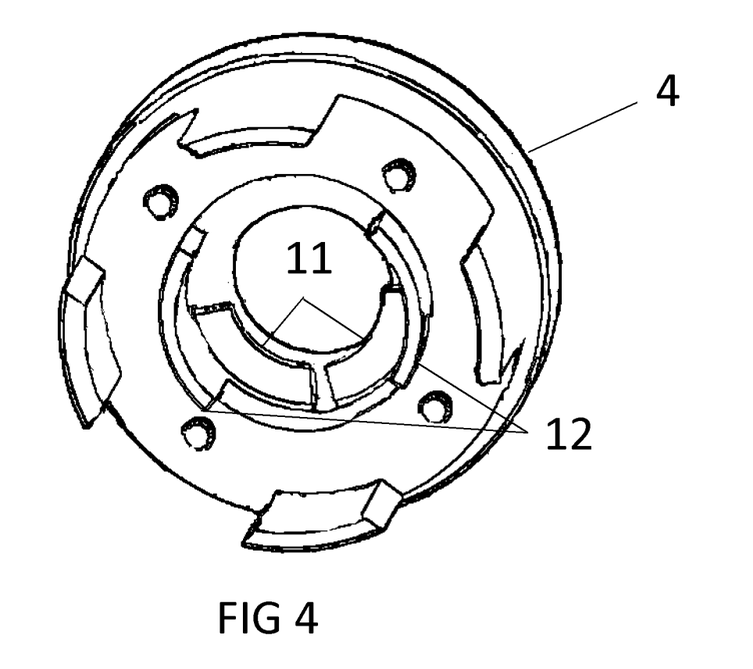
FIG. 4 shows a magnetic flux concentrator for use in a rotary position sensor in accordance with embodiments of the present invention.

Referring to FIG. 4, the magnetic flux concentrator may comprise two of such segments 9. The second parts 12 may be arranged opposite to each other, e.g. to occupy opposite quadrants in the second plane perpendicular to the axis of rotation, and the first parts 11 may be arranged next to each other, e.g. to occupy adjacent quadrants. For example, the first and second part 11, 12, of both of the two segments 9, may each cover an arc of, for example, 90°, in which the collectors are angularly shifted with respect to the collectors over, for example, 45°, in an opposite angular sense of direction, e.g. towards or away from each other.

However, embodiments of the present invention are not limited to this specific configuration of the magnetic flux concentrator. For example, the magnetic flux concentrator may be adapted for angularly shifting part of the magnetic field of the first magnetic assembly 3 from a first angular range to a second, different, angular range when comparing the field generated by the first magnetic assembly in a first region near the first magnetic assembly 3 to the modified field in a second region near the magnetic sensor, in which this shift forms a field of a different order than the field directly generated by the first magnetic assembly, e.g. a different multipole order, such as a dipole magnetic field where the first magnetic assembly generates a quadrupole field. For example, the size, e.g. the angle of the covered arc, of the collector part of each segment may be about 360° divided by the number of poles of the first magnetic assembly from which the magnetic field is collected, e.g. 360°/4=90° for a quadrupole field and 360°/6=60° for a sextupole field. However, it shall be understood by the person skilled in the art that e.g. a substantial dipole magnetic field component may be created by the excitator part for different angles, e.g. any angle covered by the arc that is substantially less than 720° divided by the number of poles of the first magnetic assembly from which the magnetic field is collected, e.g. substantially less that 180° for a quadrupole field and substantially less than 120° for a sextupole field. Likewise, the angle covered by the arc may even be substantially less than 360° divided by the number of poles, even though the efficiency might be reduced. It shall be understood by the person skilled in the art that this example relates to a conversion of the magnetic field of a multipole, e.g. a quadrupole or sextupole, into a dipole field component, but embodiments of the present invention are not limited thereto. For example, the collectors may receive a sextupole magnetic field and the excitators may supply a quadrupole magnetic field by locally reshaping the collected magnetic field.

This magnetic field of a different order is detectable by the magnetic sensor, while the field directly generated by the first magnetic assembly that is excluded from the first angular range, e.g. that is not substantially affected by the magnetic flux concentrator, may simultaneously be detected by the magnetic sensor, e.g. such that both field of different multipole order can be simultaneously detected and discerned by the magnetic sensor.

The magnetic flux concentrator may be adapted for diverting magnetic field lines, generated by the quadrupole magnet, in two adjacent quadrants around the magnet into two opposite quadrants around the magnetic sensor.

The second magnetic assembly 4 may be adapted for being rotated relative to the magnetic sensor 2 and relative to the first magnetic assembly 3 by receiving a second angle. The first magnetic assembly 3 and the second magnetic assembly 4 may be adapted for respectively receiving the first angle and the second angle from a common shaft in accordance with predetermined transmission ratios that are different for the first angle and the second angle. For example, the first magnetic assembly 3 may have an angular periodicity of the magnetic field, e.g. a periodicity having an angular period of 180°, while the second magnetic assembly 4 may generate a field having a different angular periodicity.

For example, the first angle may be related to an input angle of the input shaft via a first transmission ratio $r_1$. For example, this first transmission ratio may express an increment of the first angle caused by a unit increment of the input angle. The second angle may be related to the input angle of the input shaft via a second transmission ratio $r_2$. For example, this second transmission ratio may express an increment of the second angle caused by a unit increment of the input angle.

The magnetic field component formed by the first magnetic assembly 3 may have a first angular periodicity having a period $A_1=720°/n_1$, where $n_1$ is the pole-order of the first magnetic field component, i.e. $n_1=2$ for a dipole, $n_1=4$ for a quadrupole, $n_1=6$ for a sextupole, etc. This may correspond to a periodicity as function of the input angle of $A_1/r_1$.

The magnetic field component formed by the second magnetic assembly 4 may have a second angular periodicity having a period $A_2=720°/n_2$, where $n_2$ is the pole-order of the second magnetic field component, i.e. $n_2=2$ for a dipole, $n_2=4$ for a quadrupole, $n_2=6$ for a sextupole, etc. This may correspond to a periodicity as function of the input angle of $A_2/r_2$.

Therefore, the first transmission ratio and the second transmission ratio may be selected such that $A_1/r_1$ is not an integer multiple of $A_2/r_2$, or vice versa.

In general, the range over which the multi-turn angle of the input axis may be uniquely determined may be $k \cdot A_1/r_1$, where k is the smallest non-zero positive integer for which a second non-zero positive integer l exists such that $k \cdot A_1/r_1 = l \cdot A_2/r_2$.

For example, the first transmission ratio $r_1$ may equal ⅔, e.g. an angle increment of the first angle of 2 is achieved per 3 units of angle increment of the input angle. The second transmission ratio $r_2$ may equal 5/3, e.g. an angle increment of the second angle of 5 is achieved per 3 units of angle increment of the input angle. The magnetic field component formed by the first magnetic assembly 3 may have a first angular periodicity having a period $A_1=720°/n_1=180°$, where $n_1=4$ for a quadrupole field, i.e. the pole-order of a quadrupole field being 4. The magnetic field component formed by the second magnetic assembly 4 may have a second angular periodicity having a period $A_2=720°/n_2=360°$, where $n_2=2$ for a dipole field, i.e. the pole-order of a dipole field being 2. Therefore, in this example, $A_1/r_1=270°$ and $A_2/r_2=216°$. Thus, k=4 is the smallest non-zero positive integer for which a second non-zero positive integer (l=5) exists, such that k. $A_1/r_1=4 \times 270°=1080°=5 \times 216°=l \cdot A_2/r_2$. Thus, the angle of the input axis may be uniquely determined, in this example, in a range of 1080°, i.e. over 3 revolutions.

The second magnetic assembly 4 and the first magnetic assembly 3 may be adapted for rotating around a common axis A of rotation. The common axis of rotation may be perpendicular to a sensing surface of the magnetic sensor 2.

Figure 11:
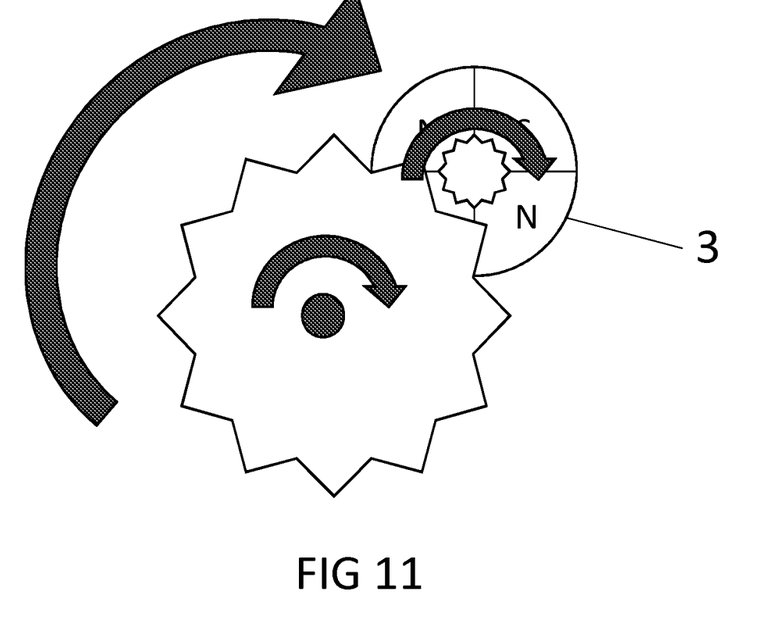
FIGS. 11 to 13 illustrate an off-center rotation of a first magnetic assembly in accordance with embodiments of the present invention.
Figure 12:
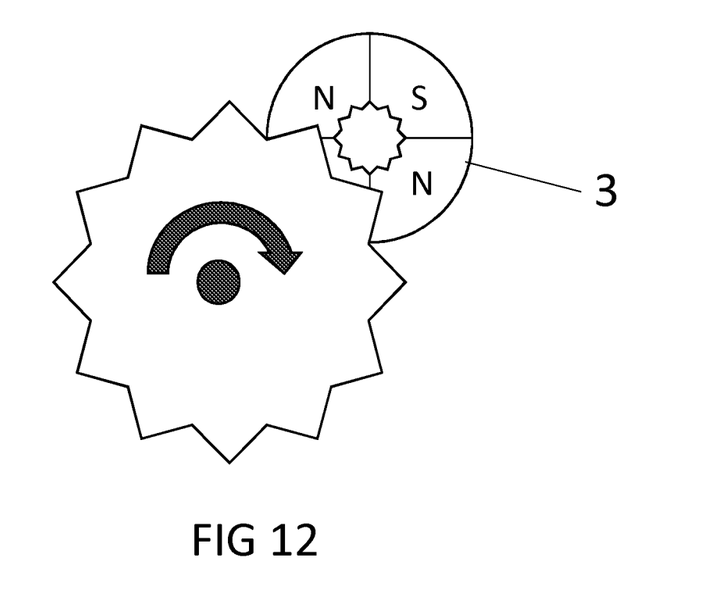
Figure 13:
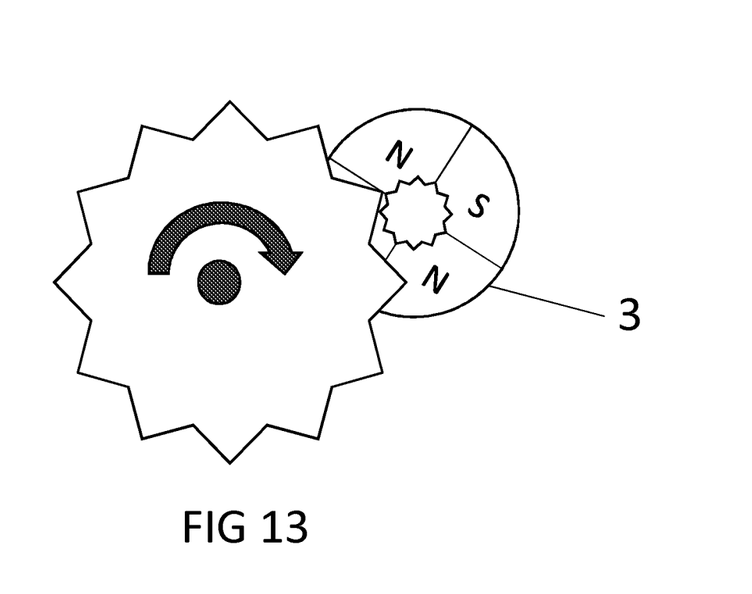

However, the magnetic assembly may also be implemented by a compound rotation of a first magnetic assembly 3, e.g. a quadrupole magnet. The first magnetic assembly may be rotatable around an off-axis center, while this off-axis center may rotate around a primary axis, as illustrated in FIG. 11 to FIG. 13, e.g. respectively showing configurations of an embodiment of the present invention at time points in a chronological time sequence. The primary axis may be aligned with the magnetic sensor 2, e.g. such that the compound rotation of the first magnetic assembly occurs in a plane parallel to the magnetic sensor, and the rotation around the primary axis is centred around the magnetic sensor. By the off-center position of a quadrupole magnet, a magnetic field having both dipole and quadrupole components is obtained in a sensing location at the magnetic sensor 2, where the quadrupole component is determined by the rotary position of the quadrupole magnet and the dipole component is determined by the angular position of the quadrupole magnet around the primary axis.

The magnetic assembly may be adapted for receiving the first angle and the second angle from a common shaft in accordance with predetermined transmission ratios that are different for the first angle and the second angle. For example, the first magnetic assembly 3 and the second magnetic assembly 4 may be adapted for respectively receiving the first angle and the second angle from a common shaft in accordance with predetermined transmission ratios that are different for the first angle and the second angle.

Figure 5:
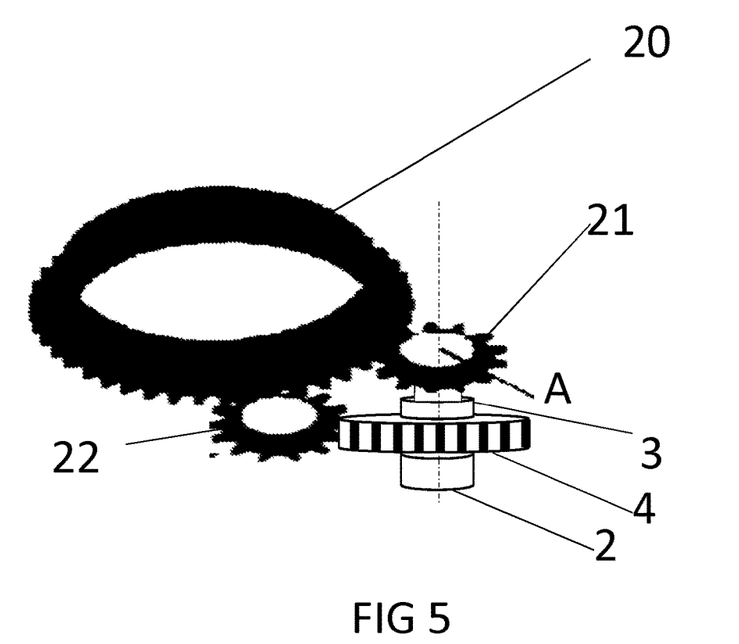
FIG. 5 illustrates a multiturn rotary position sensor in accordance with embodiments of the present invention, comprising a gear transmission assembly.

Referring to FIG. 5, the rotary position sensor 1 may comprise a gear transmission assembly for converting an input angle from the shaft to respectively the first angle applied to the first magnetic field component and to the second angle applied to the second magnetic field component. For example, such gear transmission assembly may comprise a first gear wheel 21 for rotating the first magnetic assembly 3 and a second gear wheel 22 for rotating the second magnetic assembly 4. The first gear wheel 21 and the second gear wheel 22 may have a different number of teeth for generating the different first and second angles. The first gear wheel 21 and the second gear wheel may receive an input angle from a common gear wheel 20, e.g. a hub gear wheel, mechanically linked to the shaft for which a multiturn angle is to be determined.

Figure 8:
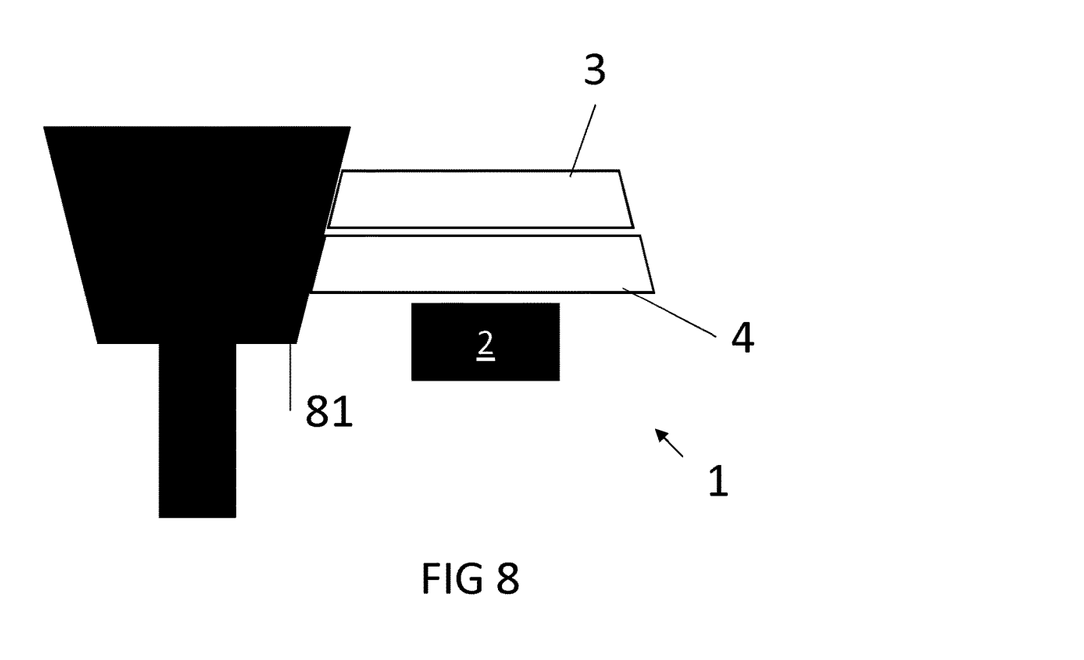
FIG. 8 shows an example of how a multiturn rotary position sensor in accordance with embodiments of the present invention can be connected to a core by different gear ratios.

Referring to FIG. 8, in another example, the rotary position sensor 1 may also comprise a gear transmission assembly for converting an input angle from the shaft to respectively the first angle applied to the first magnetic assembly 3 and to the second angle applied to the second magnetic assembly 4. Such gear transmission assembly may comprise a conic gear 81 secured to the shaft, or at least two gears having a different radius and/or a different number of teeth secured to the shaft, for engaging gears coupled to respectively the first magnetic assembly 3 and the second magnetic assembly 4. Thus, a different gear transmission ratio can be provided for translating an angle of rotation of the shaft to different first angles and second angles of respectively the first magnetic assembly 3 and the second magnetic assembly 4.

The rotary position sensor 1 further comprises a processor 5 for receiving the two independent signals and for combining the independent signals to produce a unique system state representative of the first angle and the second angle, for example to produce an angular position representative of an angle and a number of revolutions of the common input shaft by taking the predetermined transmission ratios into account.

For example, the processor and the magnetic sensor may be cointegrated in a semiconductor integrated circuit device.

The processor may be adapted for calculating, based on a first signal, of the at least two independent signals, that is indicative of a first order magnetic field of the at least two different order magnetic fields, a first angle, i.e. a first value representative of an angle, e.g. of the first angle. For example, the first order magnetic field may be a quadrupole magnetic field, e.g. generated by the first magnetic assembly 3. Thus, an angle of rotation of the quadrupole magnet may be determined in a range of 180°, e.g. due to the rotational symmetry of the quadrupole magnetic field.

The processor may be adapted for calculating, based on a second signal, of the at least two independent signals, that is indicative of a second order magnetic field of the at least two different order magnetic fields, a second angle, i.e. a second value that is representative of another angle, e.g. of the second angle. For example, the second order magnetic field may be a dipole magnetic field, e.g. provided by second magnetic assembly 4. Thus, an angle of rotation of the second magnetic assembly may be determined. For example, this angle of rotation of the second magnetic assembly may comprise a relative angle between a quadrupole magnetic field generated by the first magnetic assembly 3 and a dipole magnetic field provided by the second magnetic assembly 4, e.g. by generating a dipole magnetic field or by reshaping part of the quadrupole magnetic field generated by the first magnetic assembly 3 to a different order multipole field, e.g. a dipole field.

The processor may be adapted for calculating, based on the first angle and the second angle, a segment of the angular position of the shaft. For example, calculating this segment may comprise a rounding-off of a multiplication of a multiplicative factor and the relative angle between a quadrupole magnetic field generated by the first magnetic assembly 3 and a dipole magnetic field provided by the second magnetic assembly 4, in which this multiplicative factor is predetermined by the geometrical configuration of the second magnetic assembly 4 and the symmetry of the field generated by the first magnetic assembly 3. Note that this segment being calculated by the processor is not necessarily directly related to a (physical) segment of magnetic flux concentrator, in embodiments comprising such magnetic flux concentrator, although a geometrical correlation may exist between the calculated segment and the segment of the magnetic flux concentrator.

The segment may correspond to an integer value of the number of segments the shaft is rotated with respect to a reference position, e.g. a multiangle of 0°, in which each segment is representative of a single period of the angular symmetry of the magnetic field generated by the first magnetic assembly 3, e.g. of a 180° segment of the multiturn angle. Thus, the processor may be adapted for calculating the multiturn angle by multiplying the determined segment by the period of the angular symmetry of the magnetic field directly generated by the first magnetic assembly 3, e.g. by 180° for a quadrupole magnet, and adding the first angle to this multiplication product.

Figure 6:
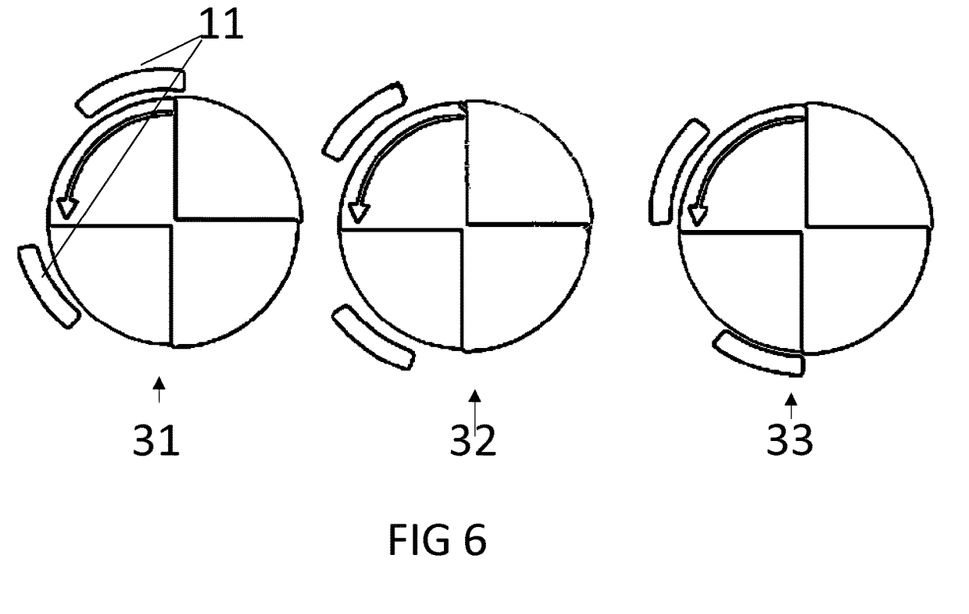
FIG. 6 shows three exemplary positions of a second magnetic assembly relative to a first magnetic assembly in a first example illustrating embodiments of the present invention.

For example, FIG. 6 shows three exemplary positions 31, 32, 33 of the first parts 11 of a second magnetic assembly 4 relative to the first magnetic assembly 3. For example, the first position 31 may correspond to a multiturn angle to be determined of 0°, the first angle, representative of an orientation of the first magnetic assembly 3, is 0° and a segment is determined as segment 0, e.g. by taking the integer part of the relative angle of the second magnetic assembly with respect to the first magnetic assembly, e.g. relative angle of the detected dipole field relative to the detected quadrupole field, divided by a factor, e.g. equal to 90°/6 for this particular example. Likewise, the second position 32 may correspond to a multiturn angle to be determined of 3×180°, the first angle is 0° and the determined segment is 3. The third position 33 may correspond to a multiturn angle to be determined of 6×180°, the first angle is 0° and the determined segment is 6.

Figure 7:
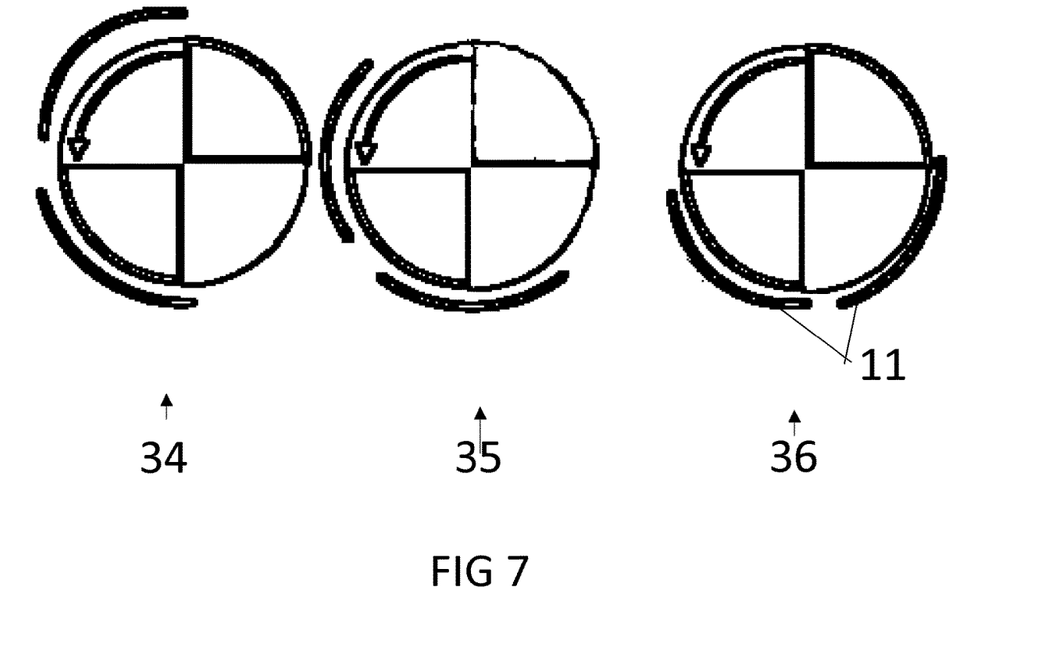
FIG. 7 shows three exemplary positions of a second magnetic assembly relative to a first magnetic assembly in a second example illustrating embodiments of the present invention.

Referring to FIG. 7, in another example, three positions 34, 35, 36 of the first parts 11 of a second magnetic assembly 4 relative to the first magnetic assembly 3 are shown. In this example, the magnetic sensor 2 is adapted for generating at least two independent signals indicative of the at least two different order magnetic fields in the form of a value indicative of the orientation of a quadrupole magnetic field and a value indicative of a magnetic flux $B_{rot}$ experienced in a rotating frame For example, the first position 34 may correspond to a multiturn angle to be determined of $-3 \times 180°$, the first angle, representative of an orientation of the first magnetic assembly 3, is 0° and a segment is determined as segment $-3$, e.g. by taking the integer part of the $B_{rot}$ flux, which is indicative of the relative angle of the second magnetic assembly with respect to the first magnetic assembly divided by a calibration factor. This calibration factor may comprise a normalization scaling of the flux value $B_{rot}$. The calibration factor may also comprise a factor determined by the geometry of the second magnetic assembly and the first magnetic assembly. The calibration factor may also comprise a temperature correction factor. Likewise, the second position 35 may correspond to a multiturn angle to be determined of 0°, the first angle is 0° and the determined segment is 0. The third position 36 may correspond to a multiturn angle to be determined of 3×180°, the first angle is 0° and the determined segment is 3.

In a second aspect, the present invention relates to a method for determining a rotary position. Such method may comprise converting an angle provided by a rotation of a shaft, for which a multiturn rotary position is to be determined, into a first angle and a second angle in accordance with different predetermined transmission ratios.

The method comprises applying a first angle to rotate a first magnetic field component relative to a magnetic sensor, in which the first magnetic field component has a first multipole order at the location of the magnetic sensor.

The method further comprises applying a second angle to rotate a second magnetic field component relative to the magnetic sensor and relative to the first magnetic field component, in which the second magnetic field component has a second multipole order, different from the first multipole order, at the location of the magnetic sensor. The method also comprises using the magnetic sensor to detect the first magnetic field component and the second magnetic field component and to generate at least two independent signals indicative of respectively the first magnetic field component and the second magnetic field component. The method further comprises combining the at least two independent signals to produce a unique system state representative of the first angle and the second angle, e.g. an angular position representative of an angle and a number of revolutions of the shaft by taking the predetermined transmission ratios into account.

In a method in accordance with embodiments of the present invention, the first order magnetic field may be a quadrupole magnetic field, and the second order magnetic field may be a dipole magnetic field.

In a method in accordance with embodiments of the present invention, the second order magnetic field may be generated by a dipole magnet, and the first order magnetic field may be generated by a quadrupole magnet. Thus, a superposition of a quadrupole magnetic field and a dipole magnetic field may be generated, and may be simultaneously detected such as to discern both the quadrupole magnetic field and the dipole magnetic field.

For example, exemplary methods for obtaining a measurement of a quadrupole angle independently of a dipole component are disclosed in WO 2014/029885.

A magnetic sensor in a rotary position sensor in accordance with embodiments of the present invention may thus comprise an arrangement for measuring the angular position of the rotor with respect to the stator as disclosed in WO 2014/029885, and the processor of such multiturn rotary position sensor in accordance with embodiments of the present invention may be adapted for performing the steps of a method for determining an angular position of the rotor with respect to the stator as disclosed in WO 2014/029885. Likewise, a method in accordance with embodiments of the present invention, may comprise a method for determining an angular position of the rotor with respect to the stator as disclosed in WO 2014/029885.

Exemplary methods for obtaining a measurement of a dipole angle independently of a quadrupole component are disclosed in WO 03/081182. Thus, a processor in a rotary position sensor in accordance with embodiments of the present invention may comprise an angle detection apparatus as disclosed in WO 03/081182.

Thus, the magnetic sensor may comprise a plurality of Hall sensor elements for detecting a dipole angle, e.g. as disclosed in WO 03/081182, and for detecting a multipole angle, e.g. a quadrupole angle, e.g. as disclosed in WO 2014/029885.

In a method in accordance with embodiments of the present invention, the first order magnetic field may be generated by a quadrupole magnet, and the second order magnetic field may be formed by locally altering the magnetic field, e.g. by a magnetic flux concentrator, to produce the second order magnetic field as a dipole magnetic field. Thus, a superposition of a quadrupole magnetic field and a dipole magnetic field may be generated, and may be simultaneously detected such as to discern both the quadrupole magnetic field and the dipole magnetic field.

In a method in accordance with embodiments of the present invention, the first value may comprise a value indicative of the orientation of the quadrupole magnetic field.

In a method in accordance with embodiments of the present invention, the second value may comprise a value indicative of the orientation of the dipole magnetic field, e.g. a value indicative of the relative orientation of the dipole magnetic field with respect to the quadrupole magnetic field. For example, the second value may comprise a magnetic flux measurement of a rotational component of the observed magnetic field $B_{rot}$.

The invention claimed is:

1. A rotary position sensor, the rotary position sensor comprising:
a magnetic sensor for detecting two different orders of a multipole expansion of a magnetic field at the magnetic sensor location and generating two independent signals indicative of said two different orders of said multipole expansion;
a magnetic assembly for forming, at the location of the magnetic sensor, a first magnetic field component having a first multipole order that corresponds to one of said two different orders of said multipole expansion that are detectable by the magnetic sensor, said first magnetic field component being rotatable relative to the magnetic sensor over a first angle, said magnetic assembly being adapted for forming a second magnetic field component having a second multipole order, different from the first multipole order and corresponding to the other of said two different orders of said multipole expansion that are detectable by the magnetic sensor, at the location of the magnetic sensor, said second magnetic field component being rotatable relative to the magnetic sensor and relative to the first magnetic field component over a second angle;
a processor for receiving said two independent signals and for combining them to produce a unique system state representative of said first angle and said second angle.

2. The rotary position sensor of claim 1, wherein said magnetic assembly is mechanically coupled to an input shaft such that said first angle relates to an input angle of the input shaft via a first transmission ratio and said second angle relates to said input angle via a second transmission ratio different from said first transmission ratio.

3. The rotary position sensor of claim 2, wherein said processor is adapted for combining said two independent signals to produce said unique system state representative of an angle within a range larger than a smallest angular magnetic periodicity of the field component or an angle and a number of revolutions of said common shaft by taking said predetermined transmission ratios into account.

4. The rotary position sensor of claim 1, wherein said magnetic sensor is adapted for detecting said at least two different orders of said multipole expansion comprising at least two of a dipole magnetic field, a quadrupole magnetic field, a sextupole magnetic field, an octupole magnetic field, or a decapole magnetic field,
wherein said two independent signals are adapted for distinguishing said at least two different order magnetic fields.

5. The rotary position sensor of claim 4, wherein said magnetic sensor is adapted for detecting at least a dipole magnetic field and a quadrupole magnetic field, and generating said two independent signals as independent signals indicative of the dipole magnetic field and the quadrupole magnetic field.

6. The rotary position sensor of claim 1, wherein said magnetic assembly comprises a first magnetic assembly for forming said first magnetic field component having said first multipole order at the location of the magnetic sensor, said first magnetic assembly being rotatable relative to the magnetic sensor by receiving said first angle, and
wherein said magnetic assembly comprises a second magnetic assembly for forming said second magnetic field component having said second multipole order at the location of the magnetic sensor, said second magnetic assembly being rotatable relative to the magnetic sensor and relative to the first magnetic assembly by receiving said second angle.

7. The rotary position sensor of claim 6, in which said first magnetic assembly comprises a quadrupole magnet for forming said first magnetic field component having said first order in the form of a quadrupole magnetic field, and in which said second magnetic assembly comprises a dipole magnet for producing said second magnetic field component having the second order in the form of a dipole magnetic field at the location of the magnetic sensor.

8. The rotary position sensor of claim 6, in which said second magnetic assembly is adapted for altering said first magnetic field component generated by the first magnetic assembly by its presence, such as to produce the second magnetic field component having the second order.

9. The rotary position sensor of claim 8, in which said second magnetic assembly comprises a magnetic flux concentrator for locally changing the magnetic field configuration of said magnetic field generated by the first magnetic assembly, such that the second magnetic field component of said second order is observed by the magnetic sensor.

10. The rotary position sensor of claim 9, wherein said magnetic flux concentrator comprises at least one segment having a first part located in a region near the first magnetic assembly and a second part in a region near the magnetic sensor, wherein said first part and said second part are offset over a predetermined angle around the axis of rotation of the first magnetic assembly, such that magnetic field lines of the magnetic field generated by the first magnetic assembly are locally displaced over this predetermined angle at the level of the magnetic sensor.

11. The rotary position sensor of claim 10, wherein said magnetic flux concentrator comprises two of said segments, such that the second parts are arranged opposite to each other and the first parts are arranged next to each other.

12. The rotary position sensor of claim 6, comprising a gear transmission assembly for converting an input angle from an input shaft to respectively the first angle applied to rotate the first magnetic field component and to the second angle applied to rotate the second magnetic field component.

13. The rotary position sensor of claim 12, wherein said gear transmission assembly comprises a first gear wheel for rotating the first magnetic assembly and a second gear wheel for rotating the second magnetic assembly, wherein said first gear wheel and said second gear wheel have a different number of teeth and/or a different perimeter for generating the different first and second angles, and wherein said first gear wheel and said second gear wheel receive an input angle from a common gear wheel mechanically linked to the input shaft for which a multiturn angle is to be determined.

14. The rotary position sensor of claim 1, wherein said processor is adapted for calculating a first angle based on a first signal, of said two independent signals, that is indicative of said first magnetic field component having said first multipole order, wherein said processor is adapted for calculating a second angle, based on a second signal, of said two independent signals, that is indicative of said second magnetic field component having said second multipole order, and wherein said processor is adapted for calculating, based on at least said second angle, a segment of the angular position of the shaft, said segment corresponding to an integer value of the number of segments the shaft is rotated with respect to a reference angular position, in which each segment is representative of a single period of the angular symmetry of the first magnetic field component.

15. A method for determining a rotary position, the method comprising:

applying a first angle to rotate, relative to a magnetic sensor, a first magnetic field component having a first multipole order at the location of the magnetic sensor;

applying a second angle to rotate, relative to the magnetic sensor and relative to the first magnetic field component, a second magnetic field component having a second multipole order, different from the first multipole order, at the location of the magnetic sensor;

detecting, using said magnetic sensor, two different orders of a multipole expansion of the magnetic field at the magnetic sensor location, by detecting said first magnetic field component and said second magnetic field component, and generating two independent signals indicative of respectively said first magnetic field component and said second magnetic field component; and combining said at least two independent signals to produce a unique system state representative of said first angle and said second angle.

* * * * *